United States Patent
Oder et al.

(10) Patent No.: US 12,304,323 B1
(45) Date of Patent: May 20, 2025

(54) PREDICTIVE TORQUE SPLIT FOR ENGINE TORQUE DETERMINATION IN MULTI-MOTOR ELECTRICALLY ALL-WHEEL DRIVE VEHICLES

(71) Applicant: FCA US LLC, Auburn Hills, MI (US)

(72) Inventors: Sezai Osman Oder, South Lyon, MI (US); Christoph Tischendorf, West Bloomfield, MI (US); Mckenzie Walsh, Auburn Hills, MI (US); Rama Rohit Varma Sagi, St. Joseph, MI (US); Ashay Sharma, Troy, MI (US); Nadirsh Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/426,688

(22) Filed: Jan. 30, 2024

(51) Int. Cl.
| | |
|---|---|
| *B60K 1/02* | (2006.01) |
| *B60K 17/35* | (2006.01) |
| *B60K 23/08* | (2006.01) |
| *B60L 15/20* | (2006.01) |
| *B60L 15/36* | (2006.01) |
| *B60K 26/02* | (2006.01) |

(52) U.S. Cl.
CPC ............ *B60L 15/2054* (2013.01); *B60K 1/02* (2013.01); *B60K 17/35* (2013.01); *B60K 23/0808* (2013.01); *B60L 15/36* (2013.01); *B60K 2026/025* (2013.01); *B60L 2200/36* (2013.01); *B60L 2260/28* (2013.01)

(58) Field of Classification Search
CPC .. B60L 15/2054; B60L 15/36; B60L 2200/36; B60L 2260/28; B60K 1/02; B60K 17/35; B60K 23/0808; B60K 2026/025
See application file for complete search history.

(56) References Cited

U.S. PATENT DOCUMENTS

| | | | |
|---|---|---|---|
| 8,287,427 B2 | 10/2012 | Sah et al. | |
| 8,550,958 B2 | 10/2013 | Sah | |
| 8,958,965 B2 | 2/2015 | Perkins et al. | |
| 9,096,226 B2 | 8/2015 | Yu et al. | |
| 10,137,799 B2 | 11/2018 | Gillespey et al. | |
| 10,518,765 B2 | 12/2019 | Liang et al. | |

(Continued)

FOREIGN PATENT DOCUMENTS

| | | | | |
|---|---|---|---|---|
| CN | 110014851 B | * | 8/2021 | ............ B60L 15/20 |
| CN | 114714919 A | * | 7/2022 | ............ B60L 15/20 |

*Primary Examiner* — Tisha D Lewis
(74) *Attorney, Agent, or Firm* — Jeremy J. Klobucar (57) ABSTRACT

A torque control system for a multi-motor range-extended electrified vehicle (REEV) having an electric all-wheel drive (eAWD) system includes a control system configured to utilize an unfiltered driver demand for engine torque determination and for predicting a front/rear axle torque split of an electrified powertrain of the REEV, the unfiltered driver demand being indicative of a torque request to be satisfied by the electrified powertrain, obtain a filtered driver demand that is damped or delayed compared to the unfiltered driver demand, and utilize the filtered driver demand for controlling a front/rear axle torque split by actuating electric motors of the electrified powertrain, wherein an engine torque delay is mitigated or eliminated thereby increasing the electrical energy to a battery system for increased availability in actuating the electric motors to control the front/rear axle torque split.

14 Claims, 5 Drawing Sheets

(56) References Cited

U.S. PATENT DOCUMENTS

| | | |
|---|---|---|
| 10,597,022 B2 | 3/2020 | Wang et al. |
| 11,299,142 B2 | 4/2022 | Akanda et al. |
| 2002/0107617 A1* | 8/2002 | Tomikawa ......... B60K 23/0808 |
| | | 903/917 |
| 2009/0204280 A1* | 8/2009 | Simon, Jr. ............. B60W 20/00 |
| | | 180/65.265 |
| 2020/0255017 A1* | 8/2020 | Siokos ................ B60K 17/354 |
| 2020/0369257 A1* | 11/2020 | Hu ....................... B60W 10/20 |

* cited by examiner

PREDICTIVE TORQUE SPLIT FOR ENGINE TORQUE DETERMINATION IN MULTI-MOTOR ELECTRICALLY ALL-WHEEL DRIVE VEHICLES

FIELD

The present application generally relates to electrified vehicles and, more particularly, to a predictive torque split for engine torque determination in multi-motor electrically all-wheel drive (eAWD) vehicles.

BACKGROUND

Electrified vehicles include electrified powertrains having one or more electric motors. One type of electrified vehicle configuration is range-extended electrified vehicles (REEV) having electric all-wheel drive (eAWD) via at least one electric motor being associated with each of the front and rear vehicle axles. In such configurations, the torque output of the electric motors is limited by the power of the battery system(s), which could be boosted by an internal combustion engine. In addition, the eAWD system shifts the front/rear axle torque split to optimize traction/grip, which could result in the electric motors providing torque less efficiently and thus not achieving the driver requested torque demand. The additional electrical power would need to be provided by the engine, which is a slow actuator. Thus, the driver demand may not be met or could have a noticeable delay associated therewith. Accordingly, while such conventional electrified vehicle torque control systems do work well for their intended purpose, there exists an opportunity for improvement in the relevant art.

SUMMARY

According to one example aspect of the invention, a torque control system for a multi-motor range-extended electrified vehicle (REEV) having an electric all-wheel drive (eAWD) system is presented. In one exemplary implementation, the torque control system comprises an input device configured to obtain an unfiltered driver demand indicative of a torque request to be satisfied by an electrified powertrain of the REEV, wherein the electrified powertrain includes at least one electric motor associated with each of front and rear axles of the REEV and an engine/generator configured to provide electrical energy to a battery system that powers the electric motors and a control system configured to utilize the unfiltered driver demand for engine torque determination and for predicting a front/rear axle torque split, obtain a filtered driver demand that is damped or delayed compared to the unfiltered driver demand, and utilize the filtered driver demand for controlling a front/rear axle torque split by actuating the electric motors, wherein an engine torque delay is mitigated or eliminated thereby increasing the electrical energy to the battery system for increased availability in actuating the electric motors to control the front/rear axle torque split.

In some implementations, the electric motors include one electric traction motor connected to each of the front and rear axles. In some implementations, the control system is configured to (i) predict the front/rear axle torque split based on the unfiltered driver demand and (ii) determine an engine torque command based on the predicted front/rear axle torque split and the unfiltered driver demand. In some implementations, the control system is configured to (i) determine the front/rear axle torque split based on the filtered driver demand and (ii) determine motor torque commands based on the determined front/rear axle torque split, the torque output of the engine, and the filtered driver demand. In some implementations, the motor torque commands include motor torque commands for the two electric traction motors connected to the front/rear axles and a motor torque command for an electric accessory motor of the engine/generator. In some implementations, the electric motors include an electric traction motor connected to one of the front and rear axles and the engine/generator is an engine connected to another electric motor/generator and the engine/generator is connected to the other of the front and rear axles. In some implementations, the REEV is a pickup truck.

According to another example aspect of the invention, a torque control method for a multi-motor REEV having an eAWD system is presented. In one exemplary implementation, the torque control method comprises obtaining, by a control system and from an input device, an unfiltered driver demand indicative of a torque request to be satisfied by an electrified powertrain of the REEV, wherein the electrified powertrain includes at least one electric motor associated with each of front and rear axles of the REEV and an engine/generator configured to provide electrical energy to a battery system that powers the electric motors, utilizing, by the control system, the unfiltered driver demand for engine torque determination and for predicting a front/rear axle torque split, obtaining, by the control system, a filtered driver demand that is damped or delayed compared to the unfiltered driver demand, and utilizing, by the control system, the filtered driver demand for controlling a front/rear axle torque split by actuating the electric motors, wherein an engine torque delay is mitigated or eliminated thereby increasing the electrical energy to the battery system for increased availability in actuating the electric motors to control the front/rear axle torque split.

In some implementations, the electric motors include one electric traction motor connected to each of the front and rear axles. In some implementations, the method further comprises (i) predicting, by the control system, the front/rear axle torque split based on the unfiltered driver demand and (ii) determining, by the control system, an engine torque command based on the predicted front/rear axle torque split and the unfiltered driver demand. In some implementations, the method further comprises (i) determining, by the control system, the front/rear axle torque split based on the filtered driver demand and (ii) determining, by the control system, motor torque commands based on the determined front/rear axle torque split, the torque output of the engine, and the filtered driver demand. In some implementations, the motor torque commands include motor torque commands for the two electric traction motors connected to the front/rear axles and a motor torque command for an electric accessory motor of the engine/generator. In some implementations, the electric motors include an electric traction motor connected to one of the front and rear axles and the engine/generator is an engine connected to another electric motor/generator and the engine/generator is connected to the other of the front and rear axles. In some implementations, the REEV is a pickup truck.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, one type of electrified vehicle configuration is range-extended electrified vehicles (REEV) having electric all-wheel drive (eAWD). In such configurations, the torque output of the electric motors is limited by the power of the battery system, which could be boosted by an internal combustion engine. In addition, the eAWD system shifts the front/rear axle torque split to optimize traction/grip, which could result in the electric motors providing torque less efficiently and thus not achieving the driver requested torque demand. The additional electrical power would need to be provided by the engine, which is a slow actuator. Thus, the driver demand may not be met or could have a noticeable delay associated therewith. This is illustrated in plot 10 of FIG. 1. As shown, the eAWD torque split request along the driver demand line differs from the most optimum torque split from an efficiency perspective. This torque split also exceeds the battery discharge power limit at the current operating conditions (i.e., the current engine/generator power). This could result in the driver demand not being met or there being a delay that could be noticeable to the driver.

Accordingly, improved torque control systems and methods for REEVs with eAWD systems are presented herein. The proposed techniques treat the eAWD system as a feed-forward function that receives a driver demanded torque and outputs a front/rear torque split request. This allows the engine torque determination function to understand what the future torque split request is going to be once the slower driver demand for the electric motor actuation reaches the "unfiltered" driver demand.

The two main benefits of these techniques are (1) an accurate engine torque command that includes the eAWD torque split request and (2) enough time for the engine to respond to the predicted eAWD torque split request. For example, when driver demand suddenly increases, the filtered driver demand for electric motor actuation responds slowly and no eAWD split is requested yet as the acceleration of the vehicle is not large enough. The unfiltered driver demand, however, acts much faster and is already at the target (for eAWD split prediction) and the engine torque determination function takes this into account. Eventually, the filtered driver demand catches up to the unfiltered driver demand and requests the eAWD split for the electric motor torque.

Figure 2:
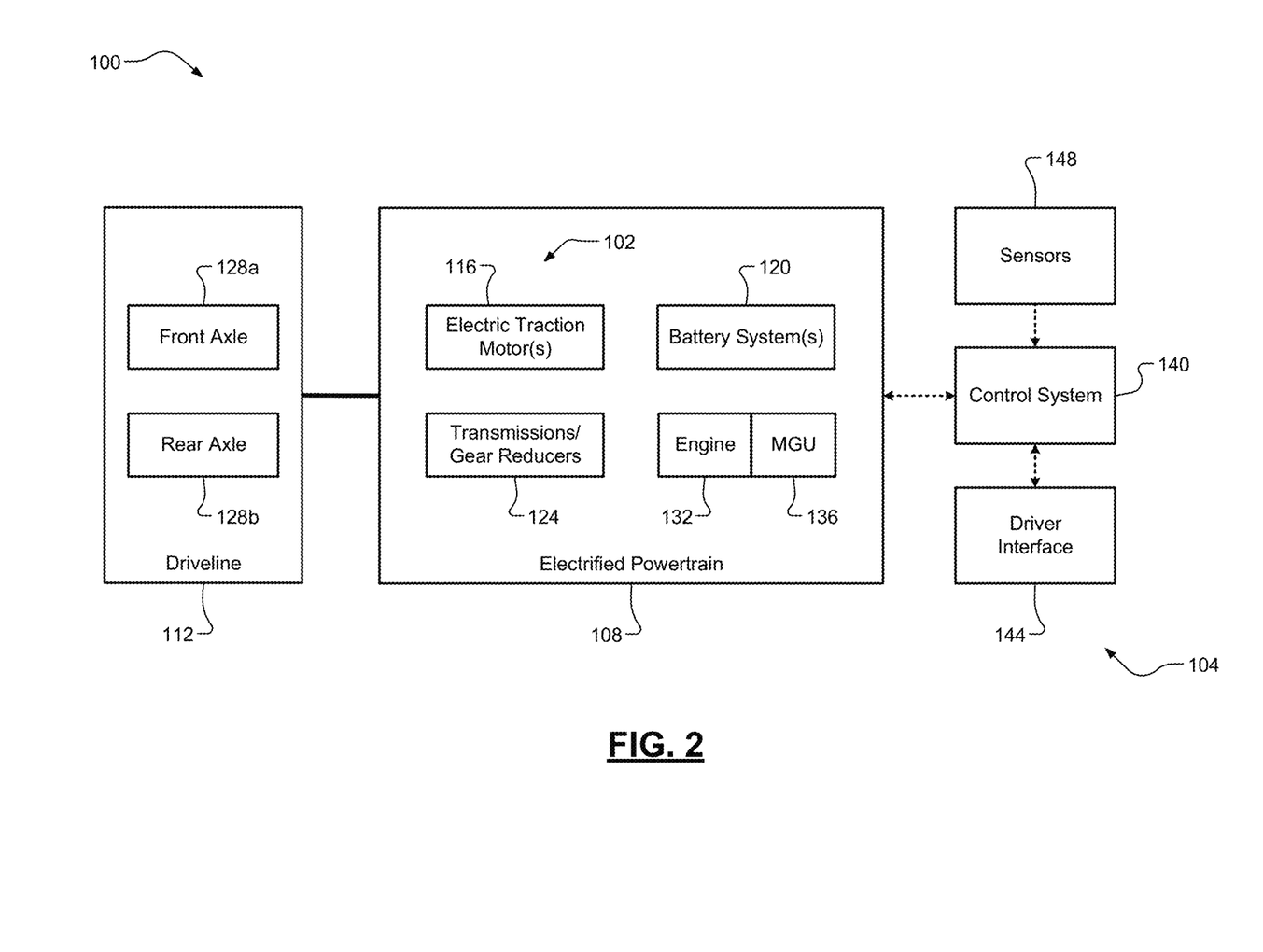
FIG. 2 is a functional block diagram of a range-extended electrified vehicle (REEV) having an electric all-wheel drive (eAWD) system and a torque control system according to the principles of the present application.

Referring now to FIG. 2, a functional block diagram of an REEV 100 (also referred to as "vehicle 100") having an eAWD system 102 and a torque control system 104 according to the principles of the present application is illustrated. The REEV 100 primarily includes an electrified powertrain 108 configured to generate and transfer drive torque to a driveline 112 for vehicle propulsion. The electrified powertrain 108 is a multi-motor electrified powertrain that could have multiple different configurations with the eAWD system 102 having at least one electric motor connectable to each of two axles of the vehicle 100. As shown, the electrified powertrain 108 includes one or more electric traction motors 116 that are powered by electrical energy provided from one or more battery systems 120 (e.g., high voltage battery pack(s)). The drive torque generated by the electric traction motor(s) 116 is transferred to the driveline 112 via one or more transmissions or gear reducers 124. In one exemplary implementation, there are two electric traction motors 116 (e.g., motor A and motor B) and each electric traction motor is connected to one of the front/rear axles 128a, 128b of the driveline 112 as part of the eAWD system 102.

The electrified powertrain 108 also includes an engine 132 configured to combust a fuel/air mixture to generate drive torque, that is converted into electrical energy by another electric motor or generator, also known as a motor/generator unit or MGU 136. The operation of the REEV 100 and, more particularly, the electrified powertrain 108, is controlled by a control system 140.

The control system 140 includes one or more controllers or electronic control units (ECUs) configured to control the electrified powertrain 108 to generate an amount of drive torque to satisfy a driver demand via a driver interface or input device 144 (e.g., an accelerator pedal). This torque control could also include controlling the front/rear torque split as part of the eAWD system 102 as well as controlling the engine 132 and the MGU 136 to provide additional electrical energy to the battery system(s) 120 such that the electric traction motor(s) 116 have increased torque capabilities to achieve/satisfy the desired torque request via the front/rear torque split. The control system 140 uses measurements from a set of sensors 148 to perform this torque controls, which includes measurements of any suitable operating parameters (speeds, torques, temperatures, etc.).

Figure 1:
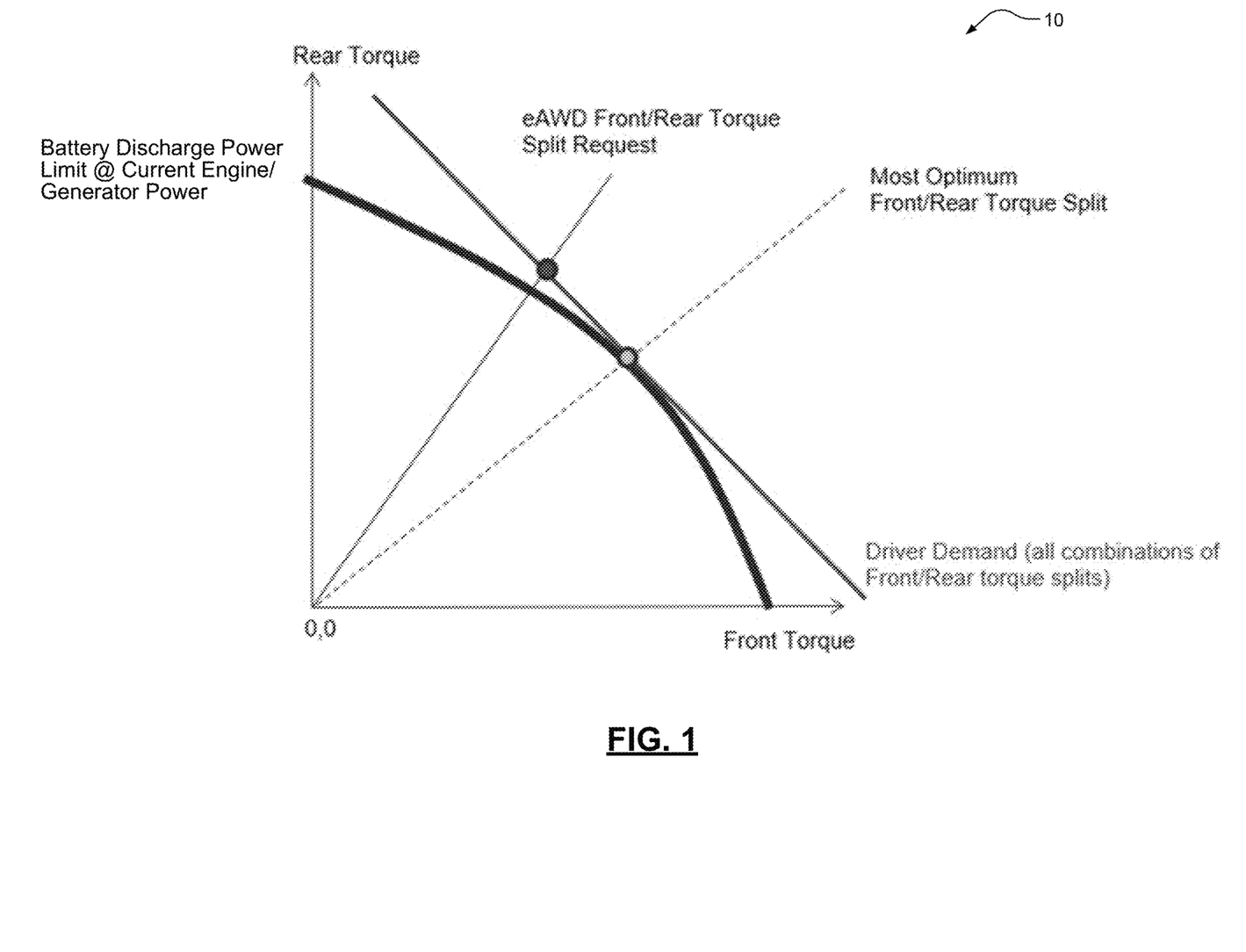
FIG. 1 is a plot of an example driver demanded front/rear axle torque splits and an eAWD torque split request that exceeds a power limit of a battery system at current engine/generator operation.
Figure 3:
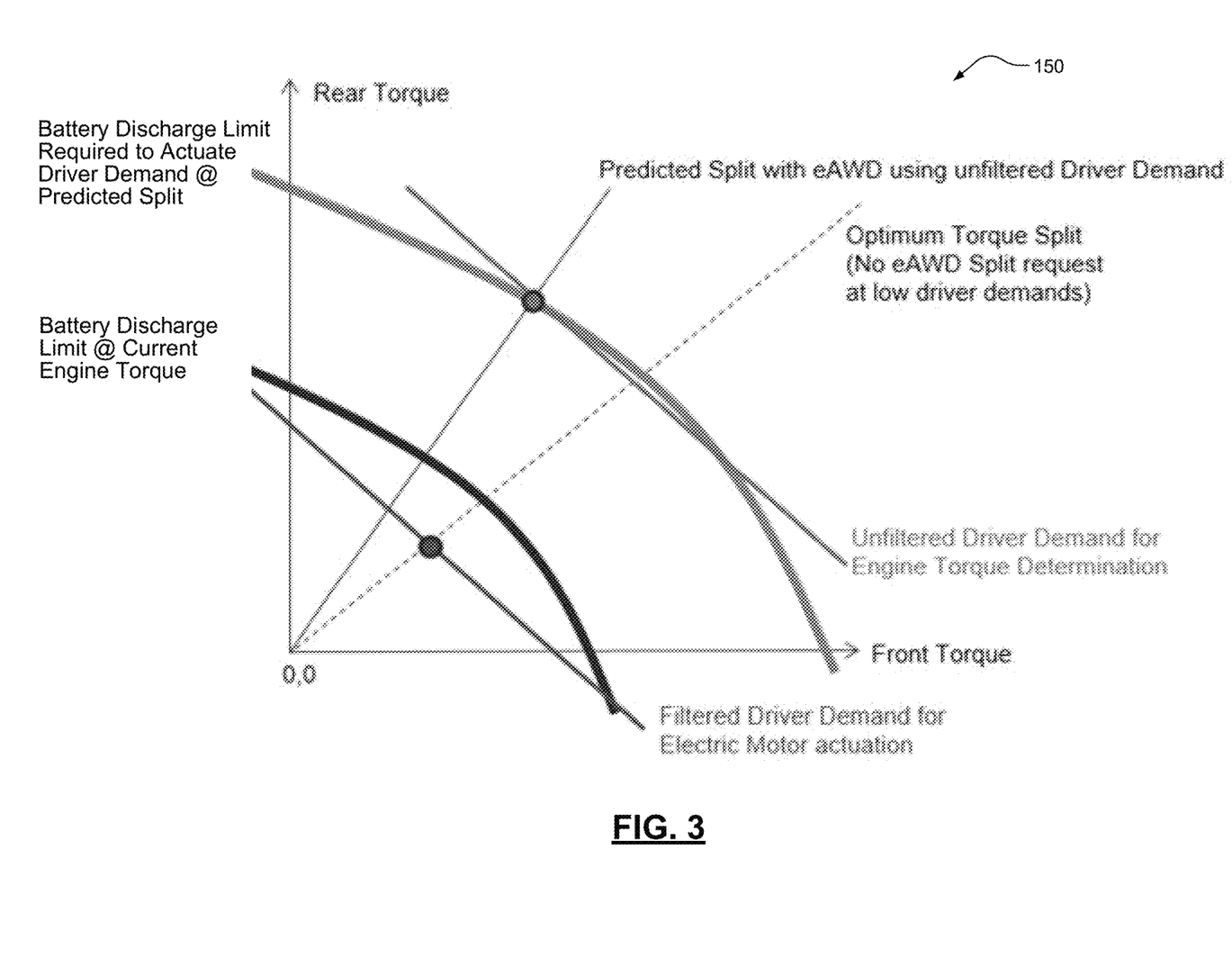
FIG. 3 is a plot of unfiltered driver demanded torque splits for engine torque determination and filtered driver demanded torque splits for electric motor actuation according to the principles of the present application.

Referring now to FIG. 3 and with continued reference to FIG. 2, a plot 150 of unfiltered driver demanded torque splits for engine torque determination and filtered driver demanded torque splits for electric motor actuation according to the principles of the present application is illustrated. As shown, the predicted eAWD torque split request along the unfiltered driver demand line differs from the most optimum torque split from an efficiency perspective. In FIG. 1, this torque split exceeded the battery discharge power limit at the current operating conditions (i.e., the current engine/generator power), which could result in the driver demand not being met or there being a delay that could be noticeable to the driver. In FIG. 3, the predicted torque split is along the unfiltered driver demand line, which is used for engine torque determination. As such, the engine torque output increases, which can be seen as the lower/smaller curve for the battery discharge limit at the current engine torque exceeding the filtered driver demand, which is used for electric motor actuation. Thus, by predictively and proactively controlling the engine torque, the electric motor actuation can then be performed without the battery discharge limit constraints that were seen/encountered in FIG. 1. The benefit includes improved response and drivability (i.e., no noticeable delay or torque drop to the driver).

Figure 4:
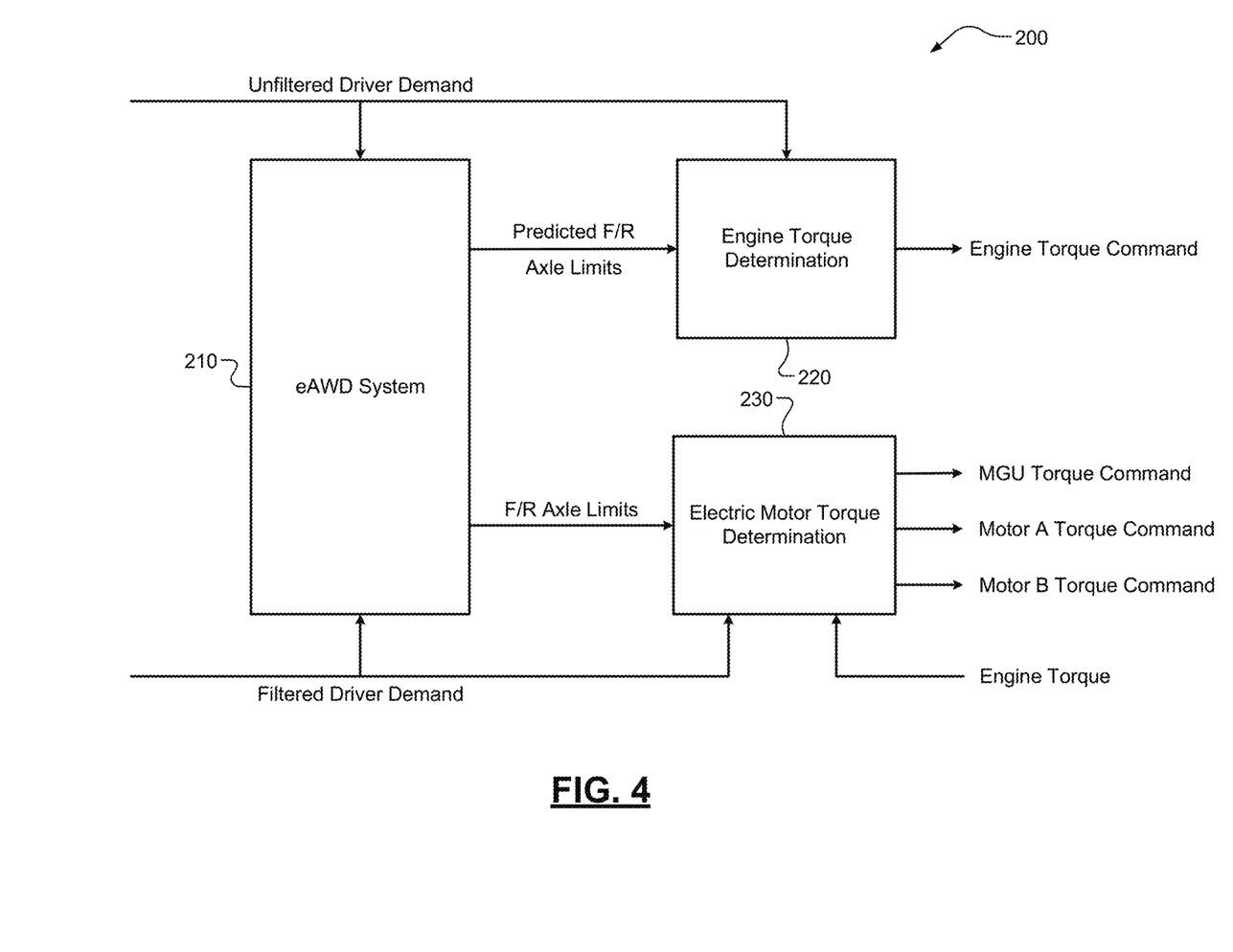
FIG. 4 is a functional block diagram of an example architecture of a control system of the example REEV of FIG. 2 according the principles of the present application.

Referring now to FIG. 4, a functional block diagram of an example architecture 200 of the control system 140 (also referred to as "control system 200") of the example REEV 100 of FIG. 2 according the principles of the present application is illustrated. It will be appreciated that this is merely one example configuration of the control system 140 and that the control system 140 could have any other suitable configurations. As shown, the control system 200 is generally divided into three blocks or components: an eAWD system controller 210, an engine torque determination/controller 220, and an electric motor torque determination/controller 230.

For example, the control system 200 could include multiple controllers/ECUs, such as an eAWD or driveline ECU, an engine ECU (e.g., an engine control unit), and a motor ECU (e.g., motor control processor(s)). The eAWD system controller 210 receives the unfiltered driver demand and, based thereon, generates/outputs predicted front/rear axle torque limits to the engine torque determination/controller 220. The eAWD system controller 210 also receives the filtered driver demand and, based thereon, generates/outputs front/rear axle torque limits to the electric motor torque determination/controller 230. The engine torque determination/controller 220 generates, based on the predicted front/rear axle torque limits and the unfiltered driver demand, an engine torque command. Lastly, the electric motor torque determination/controller 230 generates, based on the front/rear axle torque limits, the engine torque, and the filtered driver demand, an MGU torque command and motor (e.g., motor A/B) torque command(s).

Figure 5:
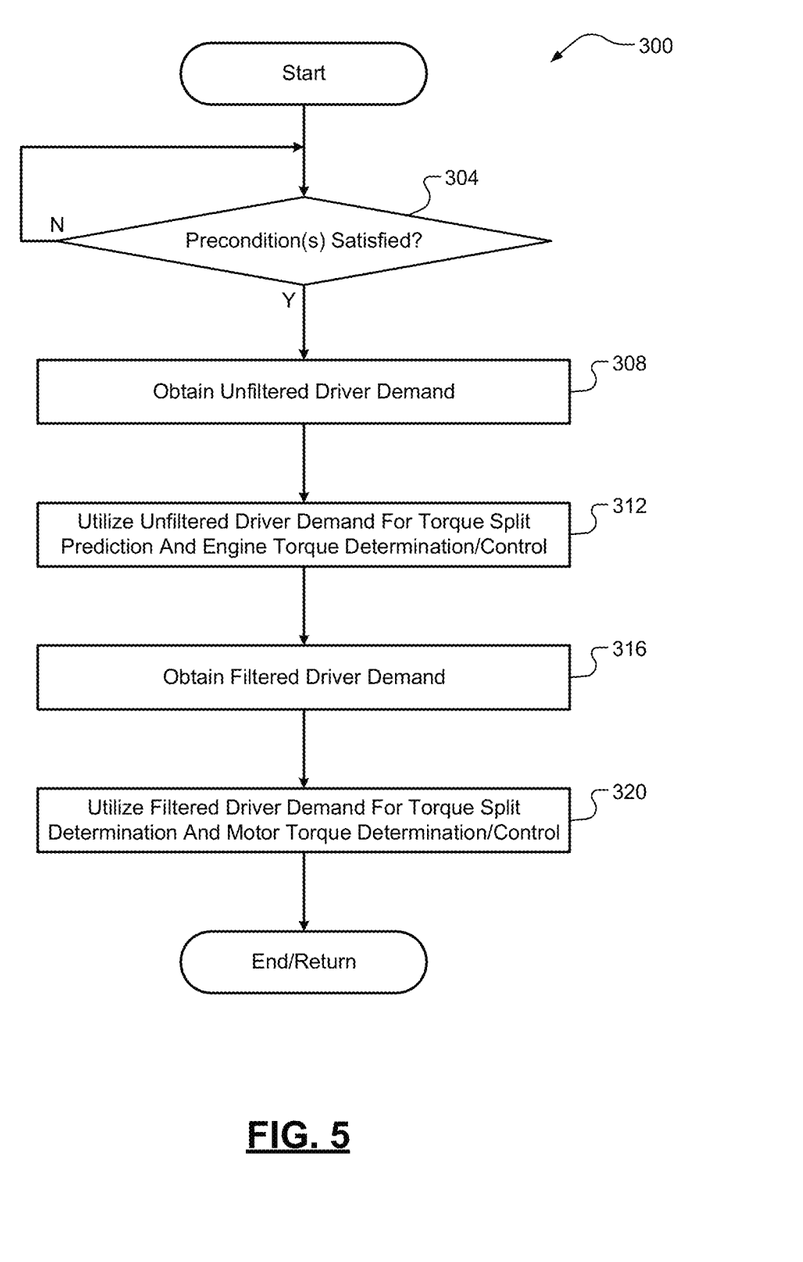
FIG. 5 is a flow diagram of an example improved torque control method for an REEV having an eAWD system according to the principles of the present application.

Referring now to FIG. 5, a flow diagram of an example improved torque control method 300 for an REEV having an eAWD system according to the principles of the present application is illustrated. While the REEV 100 and its components are specifically referenced for illustrative/descriptive purposes, it will be appreciated that the method 300 could be applicable to any suitably configured multi-motor REEV. The method 300 begins at 304. At 304, the control system 140 determines whether an optional set of one or more preconditions are satisfied.

These precondition(s) could include, for example only, the electrified powertrain 108 being powered-up and running and there being no malfunctions or faults present that would negatively impact or otherwise inhibit the operation of the techniques of the present application. When false, the method 300 ends or returns to 304. When true, the method 300 proceeds to 308. At 308, the control system 140 obtains the unfiltered driver demand from the driver of the REEV 100 as provided by the driver via the driver interface 144 (e.g., an accelerator pedal), which could be a raw/unfiltered signal from the driver interface 144.

While the unfiltered driver demand is described as being unfiltered relative to the filtered driver demand discussed herein, it will be appreciated that the unfiltered driver demand could also have some other filtering/pre-processing applied thereto. At 312, the control system 140 predicts the front/rear axle torque split and determines the torque output of the engine 132 based on the unfiltered driver demand and then controls the engine 132 accordingly. At 316, the control system 140 obtains the filtered driver demand. As previously discussed herein, this filtered driver demand is a damped or delayed version of the driver demand. For example, a hysteresis could be applied thereto. In other words, the filtered driver demand is a less aggressive signal for electric motor control. At 320, the control system 140 determines the torque split and determines the torque outputs of the motors 116, 136 and then controls the motors 116, 136 accordingly. The method 300 then ends or returns to 304 for one or more additional cycles.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque control system for a multi-motor range-extended electrified vehicle (REEV) having an electric all-wheel drive (eAWD) system, the torque control system comprising:
    an input device configured to obtain an unfiltered driver demand indicative of a torque request to be satisfied by an electrified powertrain of the REEV, wherein the electrified powertrain includes at least one electric motor associated with each of front and rear axles of the REEV and an engine and a generator configured to provide electrical energy to a battery system that powers the electric motors; and
    a control system configured to:
        utilize the unfiltered driver demand for engine torque determination and for predicting a front and rear axle torque split;
        obtain a filtered driver demand that is damped or delayed compared to the unfiltered driver demand; and
        utilize the filtered driver demand for controlling the front and rear axle torque split by actuating the electric motors,
    wherein an engine torque delay is mitigated or eliminated thereby increasing the electrical energy to the battery system for increased availability in actuating the electric motors to control the front and rear axle torque split.

2. The torque control system of claim 1, wherein the electric motors include one electric traction motor connected to each of the front and rear axles.

3. The torque control system of claim 2, wherein the control system is configured to (i) predict the front and rear axle torque split based on the unfiltered driver demand and (ii) determine an engine torque command based on the predicted front and rear axle torque split and the unfiltered driver demand.

4. The torque control system of claim 3, wherein the control system is configured to (i) determine the front and rear axle torque split based on the filtered driver demand and (ii) determine motor torque commands based on the determined front and rear axle torque split, a torque output of the engine, and the filtered driver demand.

5. The torque control system of claim 4, wherein the motor torque commands include motor torque commands for the two electric traction motors connected to the front and rear axles and a motor torque command for an electric accessory motor of the generator.

6. The torque control system of claim 1, wherein the electric motors include an electric traction motor connected to one of the front and rear axles and another electric motor of the generator that is connected to the engine, and wherein the engine and the generator are connected to the other of the front and rear axles.

7. The torque control system of claim 1, wherein the REEV is a pickup truck.

8. A torque control method for a multi-motor range-extended electrified vehicle (REEV) having an electric all-wheel drive (eAWD) system, the torque control method comprising:

obtaining, by a control system and from an input device, an unfiltered driver demand indicative of a torque request to be satisfied by an electrified powertrain of the REEV, wherein the electrified powertrain includes at least one electric motor associated with each of front and rear axles of the REEV and an engine and a generator configured to provide electrical energy to a battery system that powers the electric motors;

utilizing, by the control system, the unfiltered driver demand for engine torque determination and for predicting a front and rear axle torque split;

obtaining, by the control system, a filtered driver demand that is damped or delayed compared to the unfiltered driver demand; and utilizing, by the control system, the filtered driver demand for controlling the front and rear axle torque split by actuating the electric motors, wherein an engine torque delay is mitigated or eliminated thereby increasing the electrical energy to the battery system for increased availability in actuating the electric motors to control the front and rear axle torque split.

9. The torque control method of claim 8, wherein the electric motors include one electric traction motor connected to each of the front and rear axles.

10. The torque control method of claim 9, further comprising (i) predicting, by the control system, the front and rear axle torque split based on the unfiltered driver demand and (ii) determining, by the control system, an engine torque command based on the predicted front and rear axle torque split and the unfiltered driver demand.

11. The torque control method of claim 10, further comprising (i) determining, by the control system, the front and rear axle torque split based on the filtered driver demand and (ii) determining, by the control system, motor torque commands based on the determined front and rear axle torque split, a torque output of the engine, and the filtered driver demand.

12. The torque control method of claim 11, wherein the motor torque commands include motor torque commands for the two electric traction motors connected to the front and rear axles and a motor torque command for an electric accessory motor of the generator.

13. The torque control method of claim 8, wherein the electric motors include an electric traction motor connected to one of the front and rear axles and another electric motor of the generator that is connected to the engine and wherein the engine and the generator are connected to the other of the front and rear axles.

14. The torque control method of claim 8, wherein the REEV is a pickup truck.

* * * * *